United States Patent
Gureghian et al.

(10) Patent No.: US 9,485,225 B2
(45) Date of Patent: Nov. 1, 2016

(54) METHOD FOR MANUFACTURING A FILTERING MODULE

(71) Applicant: THALES, Neuilly sur Seine (FR)

(72) Inventors: Emmanuel Tigrane Gureghian, Neauphle (FR); Patrick Duputz, Asnieres sur Seine (FR); Olivier Grisal, Conflans Sainte Honorine (FR)

(73) Assignee: THALES, Neuilly sur Seine (FR)

( * ) Notice: Subject to any disclaimer, the term of this patent is extended or adjusted under 35 U.S.C. 154(b) by 93 days.

(21) Appl. No.: 14/141,652

(22) Filed: Dec. 27, 2013

(65) Prior Publication Data
US 2014/0189345 A1   Jul. 3, 2014

(30) Foreign Application Priority Data

Dec. 28, 2012 (FR) ..................... 12 03622

(51) Int. Cl.
*H04L 29/06* (2006.01)
*G06F 21/72* (2013.01)

(52) U.S. Cl.
CPC .......... *H04L 63/0428* (2013.01); *G06F 21/72* (2013.01); *H04L 63/0254* (2013.01); *H04L 63/20* (2013.01); *H04L 63/205* (2013.01); *G06F 2221/2113* (2013.01)

(58) Field of Classification Search
CPC . H04L 63/0428; H04L 63/205; H04L 63/20; H04L 63/0254; G06F 21/72; G06F 2221/2113
USPC ......................................................... 713/154
See application file for complete search history.

(56) References Cited

U.S. PATENT DOCUMENTS

| 5,995,628 A * | 11/1999 | Kitaj et al. ..................... 713/164 |
| 2008/0101222 A1* | 5/2008 | Christenson .................. 370/230 |
| 2012/0036581 A1* | 2/2012 | Maximilien et al. ........... 726/26 |

OTHER PUBLICATIONS

Susan Hinrichs, *Policy-BasedManagement: Bridging the Gap*, Proceedings / 15th Annual Computer Security Applications Conference: Dec. 6-10, 1999, Phoenix, Arizona, IEEE Computer Society, Los Alamitos, CA (Dec. 6, 1999), pp. 209-218.
*CPA Security Characteristic IP Filtering Firewalls*, Version 1.1, CESG UK, (Jan. 1, 2011), XP055084557, (accessible at http://www.cesg.gov.uk/publications/Documents/sc_for_ip_filtering_firewalls.pdf) p. 12, line 41-p. 12, line 46.

* cited by examiner

*Primary Examiner* — Harunur Rashid
(74) *Attorney, Agent, or Firm* — Davidson, Davidson & Kappel, LLC

(57) ABSTRACT

A method is provided for defining a filtering module between a first module processing information with a first sensitivity level, and a second module processing information with a second sensitivity level connected, in parallel with the filtering module, by a cryptographic module. The method includes defining a set of filtering rules in a language that can be compiled, defining the properties of messages whereof transmission is allowed between the first and second modules; validation processing the predefined set of rules, validating that a transmission authorization or refusal has in fact been provided by applying the set of rules to any information that may be provided at the input of the filtering module; compiling the predefined set of rules; and integrating the compiled set of rules into a rules database of the filtering module.

8 Claims, 1 Drawing Sheet

METHOD FOR MANUFACTURING A FILTERING MODULE

This claims the benefit of French Patent Application FR 12 03622, filed Dec. 28, 2012 and hereby incorporated by reference herein.

The present invention relates to the field of the security of information systems. It more specifically pertains to the definition of a filtering module suitable for filtering information using a predetermined security policy, between a first module capable of processing information with a first sensitivity level, and a second module capable of processing information with a second sensitivity level, said first and second modules being connected, in parallel with the filtering module, by a cryptographic module suitable for applying cryptographic functions.

BACKGROUND

Such filtering modules are in particular part of systems having an architecture comprising modules with distinct sensitivity levels and a cryptographic module. Cryptographic equipment, such as encryptors, is in particular found in such systems.

These distinct sensitivity level domains are for example called red module and black module. The red module for example processes and stores sensitive information, called red information, in clear. The black module for example processes and stores information that is less sensitive than the red information. This less sensitive information, called black information, is either information in clear, which is intrinsically less sensitive than the red information, or encrypted red information, which is intrinsically sensitive but desensitized by encryption.

The red module furthermore processes and includes black information.

Typically, the information that is not identifiable as red information or black information is considered to be red information by default, within the red module.

Typically, the information that is not identifiable as red information or black information is considered to be black information by default, within the black module.

The cryptographic module implements the cryptographic functions necessary for the encryption of the red information. It is situated in an interruption between the red and black modules. The cryptographic systems also comprise two external interfaces: a first interface or user interface or private network interface, connected to the red module, and a second interface or wired or wireless public network interface, connected to the black module.

The cryptographic system in particular comprises a "cipher" mode specific to the processing of sensitive information.

In the "cipher" mode:
the red information, entering on the user interface, is encrypted by the cryptographic block and leaves blackened on the wired or wireless public network interface of the black module.
the black information entering the wired or wireless public network interface is decrypted by the cryptographic block and leaves, in clear, on the user interface of the red module.

The filtering module is also positioned between the red module and the black module.

The filtering module applies a security policy, which defines all of the black information allowed to pass through it, from the red module toward the black module, and from the black module toward the red module.

For example, the black information, processed by the red module and intended for the black module, is sent in clear via the filtering module. The latter guarantees that only the black information is sent to the black module. The red information is blocked by the filtering module, thereby decreasing the risk of that information being compromised on the wired or wireless network.

The behavior of such a filtering module is most often frozen in time, since it is installed in the form of hardware and/or in the form of a dedicated software program. It is therefore difficult and expensive to modify and adapt the behavior of the filtering module. The process for manufacturing new filtering modules is also difficult and expensive.

Furthermore, the filtering module is called upon directly by the applications of the red module (the black module, respectively), and as a result, the security policy actually applied is not explicit, but is implicitly defined by the invocations of the filter done by the applications of the red module (black module, respectively).

SUMMARY OF THE INVENTION

The present invention aims to propose a solution to these limitations.

To that end, according to a first aspect, the invention proposes a method for defining a filtering module of the aforementioned type, characterized in that it comprises the following steps:
a set of filtering rules is defined, translating the predetermined security policy, in a language that can be compiled, said filtering rules defining the properties of the information whereof transmission is allowed by the filtering module between the first and second modules;
validation processing for the predefined set of rules is carried out, validating that a transmission authorization or refusal has in fact been provided by applying said set of rules to any information that may be provided at the input of the filtering module;
said predefined set of rules is compiled;
said compiled set of rules is integrated into a rules database of the filtering module.

Such a method decreases the costs and work effort necessary for the iterative definition of a filtering module and the modification thereof, both during its design stage and during a maintenance stage during its operational running. Such a method also decreases the risk of design error of the filtering module, and thereby makes it possible to minimize the risk of security vulnerabilities. It further makes it possible to decrease the complexity and computation burden necessary for modifications, whether corrective or in the form of upgrades, of a filtering module.

In embodiments, the method for defining a filtering module according to the invention further includes one or more of the following features:
the set of filtering rules defines static, time and dynamic properties of the information that can be transmitted;
the set of filtering rules includes at least one protocol automaton, defined by a set of states corresponding to successive steps of the implementation of a communication protocol, and events causing transitions between said states;
the filtering module includes a processing module capable of executing all of the rules integrated into the rules database upon receipt of information to be filtered and capable of allowing or refusing transmission by the filtering module of said information between the first and second modules according to a refusal or an authorization provided following the execution of said set of rules;

state variables associated with the filtering rules are defined, and a refusal or authorization is provided following the execution of said set of rules as a function of current values calculated for said state variable values;

the validation processing for the predefined set of rules further comprises a step for validating the coherence of the rules of said set of rules;

the step for validating the coherence of the rules comprises detecting at least one anomaly from among:

the existence in the set of rules of first and second rules associated with different actions, the first rule being applied on all of the objects of the second;

the existence in the set of rules of two rules associated with different actions, and each of them is applied on a subset of the objects to which the other is applied;

the existence of two rules executing the same action on the same objects, the set of rules is defined according to a rules tree structure;

the filtering module is defined such that the information from the first module whereof transmission is authorized by the filtering module is transmitted to the second module in clear, the application order and logic composition of the results of the rules is defined by the set of filtering rules.

According to a second aspect, the present invention proposes a filtering module suitable for filtering information according to a security policy between a first module capable of processing sensitive information, and a second module capable of processing non-sensitive information, said first and second modules being connected, in parallel with the filtering module, by a cryptographic module suitable for applying cryptographic functions, said filtering module being characterized in that it comprises a processing module and a rules database including a set of rules defining the predetermined security policy, in a compiled language, said filtering rules defining the properties of the information whereof transmission is authorized by the filtering module between the first and second modules.

According to a third aspect, the present invention proposes cryptographic equipment including:

a first module capable of processing information with a first sensitivity level;

a second module capable of processing information with a second sensitivity level different from the first sensitivity level;

a cryptographic module suitable for applying cryptographic functions, connecting said first and second modules;

a filtering module, suitable for filtering information according to a security policy between the first module and the second module.

BRIEF SUMMARY OF THE DRAWINGS

The features and advantages of the invention will appear upon reading the following description, provided solely as an example, and done in reference to the appended drawings, in which.

DETAILED DESCRIPTION

Figure 1:
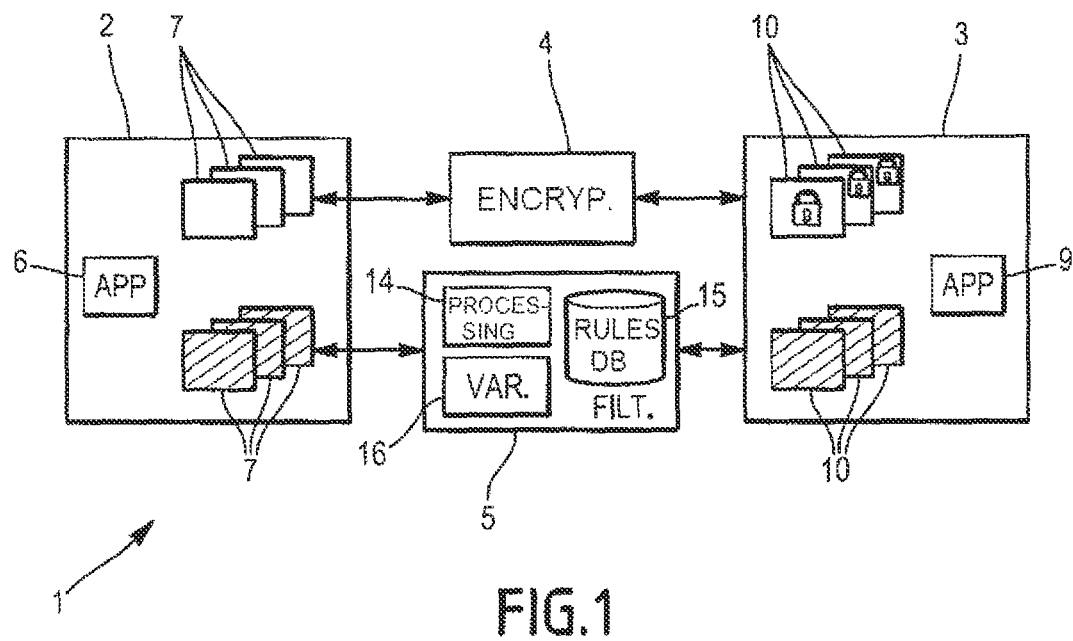
FIG. 1 shows a cryptographic system in one embodiment of the invention.
Figure 2:
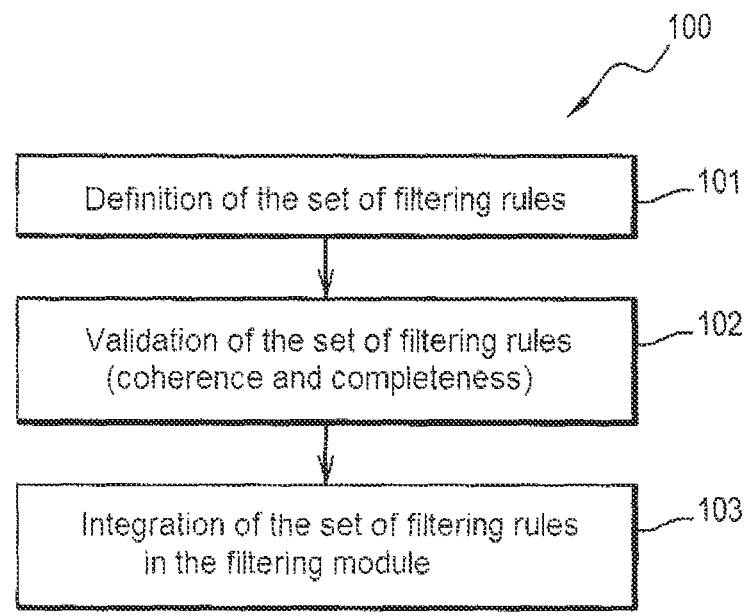
FIG. 2 defines a flowchart of steps of a method for defining a filtering module in one embodiment of the invention.

In one embodiment of the invention, a cryptographic system is considered, illustrated in FIG. 1. In the considered example, the cryptographic system is cryptographic equipment 1 of the encryptor type.

This equipment is characterized by a security architecture including four main modules: a module 2 processing sensitive information, also called red module, a module 3 processing non-sensitive information, called black module, a cryptographic module 4, and a filtering module 5.

In one embodiment, the red module pertains to a first security level, and the black module pertains to a second security level, which is for example lower than the first level.

The red module 2 and the black module 3 are each connected on the one hand to the cryptographic module 4 and on the other hand to the filtering module 5.

The red module 2 is capable of processing, in particular using applications 6, sensitive messages 7 in clear.

The black module 3 is capable of processing, in particular using applications 9, only non-sensitive messages 10, i.e., messages that do not compromise security in case of disclosure. This information is either information in clear, which is intrinsically non-sensitive, or encrypted information, which is intrinsically sensitive but made non-sensitive by encryption.

The cryptographic equipment 1 is further capable of decrypting messages going from the black module 3 to the red module 2 by providing those messages to the cryptographic module 4, which for example carries out algorithms and cryptographic keys to decrypt those messages.

The cryptographic equipment 1 is furthermore suitable for allowing messages to be sent from the black module 3 to the red module 2 without performing any decryption, by providing those messages to the filtering module 5 and on the condition that the filtering module 5 deems that those messages do not violate the security of the red module and that their transmission in clear is essential to the normal operation of the cryptographic equipment 1, for example the information for monitoring and management plans (signaling, routing, etc.). In particular, messages lacking integrity (e.g., not faithful and/or not authentic, in particular, certain malformed messages) are detected, then rejected.

The cryptographic equipment 1 is suitable for encrypting sensitive messages to be sent from the red module 2 to the black module 3 by providing the sensitive messages to the cryptographic module 4, which for example carries out algorithms and cryptographic keys to encrypt the messages.

The cryptographic equipment 1 is further suitable for allowing the transmission in clear of messages from the red module 2 to the black module 3 by providing those messages to the filtering module 5, and on the condition that the filtering module 5 deems that those messages are not sensitive and that their transmission in clear is essential to the normal operation of the cryptographic equipment 1, for example the information for monitoring and management plans (signaling, routing, etc.).

The filtering module 5 is suitable for determining whether a message from the red module 2 that it receives as input can be sent in clear to the black module 3. If it is determined that the message may be sent to the black module 3, the filtering module 5 then sends it to the black module 3.

Similarly, the filtering module 5 is suitable for determining whether a message from the black module 3 that it receives as input can be sent in clear to the red module 2. In the event it is determined that the message may be sent to the red module 2, the filtering module 5 then sends it to the red module 2.

In the considered embodiment, the filtering module 5 includes a processing module 14, an invariant rules database 15 defining the selected security policy, and a state variables block 16 including current values of state variables associated with the rules.

The security recommendations in force on the architecture of cryptographic equipment recommend clearly separating the cryptographic module 4 and the filtering module 5 from the rest of the equipment.

In order to obtain an approval that authorizes the deployment of the cryptographic equipment 1 in a client infrastructure, a safety evaluation is conducted to verify the compliance of the cryptographic equipment 1 with security standards and recommendations.

Method for Manufacturing a Filtering Module

According to a first aspect, the invention proposes a method 100 for manufacturing a filtering module similar to the filtering module 5 of the cryptographic equipment 1.

Such a method makes it possible to develop a security policy in a form that is applicable by a filtering module.

This method 100 includes several steps, in order to generate a rules database 15 from a predetermined security policy.

In a first step 101, the security policy to be applied by the filter module 5 is described by defining a set of filtering rules.

In the concerned embodiment, one or more filtering rules are defined using one or more protocol automatons.

These filtering rules, including the protocol automatons, are defined in a flexible, deterministic and readable description language.

In one embodiment, the description of the security policy assumes the form of a tree, with a root-type element (for example: the "POLICY" element), which includes one or more thread elements of the intermediate node type, some of which in turn include one or more thread elements of the intermediate node type (for example, the "FIELD" intermediate node-type element defines a property of the message to which the filtering rules can be applied), until leaf-type elements are reached (for example: "FREQUENCY" and "BANDWIDTH" leaf-type elements constitute filtering rules, stipulating frequency or bandwidth values allowing the passage of the message or requiring rejection of the message), which do not have thread-type elements.

In one embodiment, two categories of elements of the security policy are defined:
assessable elements of the "filtering rule" type, which define a passage condition for the message. This condition makes it possible to verify the message based on a given static property (format of the message, passage direction of the message, the value of the information fields of the message), time property (passage frequency of the message, bit rate created by an information field), or dynamic property (protocol automaton).
the descriptive elements (for example "AUTOMATON", and "STATE", "TRANSITION"), which define a protocol automaton. A protocol automaton is characterized by a set of states, a set of transitions between those states, and an initial state. Each state of the protocol automaton indicates a particular stage in a predetermined message sequence, exchanged successively between the red and black modules, according to a given communication protocol. Such a protocol automaton for example makes it possible to monitor that the passage of a "SIP REPLY"-type message follows the passage of a "SIP REQUEST"-type message.

In one embodiment, the "filtering rule" security policy elements are accessible (individually), and return a result of the Boolean type:
True or "TO BE SENT",
False or "DO NOT SEND".

Furthermore, the "filtering rule" security policy elements define the evaluation order of their daughter rules, and the logic composition of their Boolean results, for example:
Evaluation of that rule (AND) Evaluation of daughter rule no. 1 (AND) Evaluation of daughter rule no. 2 (AND) . . . Evaluation of daughter rule no. N
Evaluation of that rule (OR) Evaluation of daughter rule no. 1 (OR) Evaluation of daughter rule no. 2 (OR) . . . Evaluation of daughter rule no. N Filtering rules depend on state variables 16. For example, a state variable represents a bandwidth, a number of a certain type of messages received by the filtering module, or the moment of receipt of the last received message of a given type, etc.

The evaluation of an element of the security policy, of the filtering rule type, may cause the modification of state variables 16 associated with the security policy. This modification is effective if the message is completely in accordance with the security policy applied by the filtering module 5 (i.e., all of the evaluated filtering rules have returned TRUE or "TO BE SENT").

An element of the filtering rule type may be associated with a protocol automaton, such that the receipt of a given message causes a given state transition of a protocol automaton. The evaluation of such an element then causes the modification of at least one state variable containing the current state of that protocol automaton.

As an example, a simple protocol automaton, made up of two states {"Idle", "Running"} and monitored by two events "Start" and "Stop" such that the occurrence of the "Start" event when it is in the "Idle" state causes it to go to the "Running" state, and the occurrence of the "Stop" event when it is in the "Running" state causes it to go to the "Idle" state.

A rule is defined by the set of objects to which it applies (generally messages verifying the condition defined by the rule, typically message properties such as a passage direction, a value of a field, a frequency, etc.), and by the associated actions that it applies to those objects.

These actions are for example the provision of a "TO BE SENT" or "DO NOT SEND" result, and the modification of any state variables associated with the rule.

The action(s) are in particular applied based on whether the received message verifies the condition, i.e., whether the received message is an object to which it applies.

The rules are varied.

Some of the rules make it possible to discriminate between the allowed data formats and the unauthorized data formats.

For example, let us suppose that certain messages allowed to be sent by the filtering module through the considered security profile must be made up of a sequence of three information fields: "Type", "Size" and "Value", i.e., have a TLV (Type-Length-Value) information field, such that:
the 'Type' field must have a fixed size, equal to 16 bits,
the 'Size' field must have a fixed size, equal to 16 bits, the 'Value' field has a variable size, equal to the value of the 'Size' field, which must be in the bit range [0, 1020].

The rule for verifying the syntax of a message will thus set out the conditions defining the objects-messages to which it applies:

```
FIELD id='Type' size='2'
    [ . . . ]
FIELD id='Size' size='2'
    [ . . . ]
FIELD id='Value' size='$Size' min='0' max='1024'
    [ . . . ]
``` where $Size is a time variable that contains the value of the field whereof the identifier (id) is 'Size'; [ . . . ] indicates that thread elements can further be defined at that level, such as rules or properties or the use of automatons.

Rules make it possible to reduce the time hidden channels.

As a reminder, "hidden channels", implemented by the messages sent by the filtering module, refer to the transmission of information other than that sent within the message itself, but such information can be determined based on the sending frequency of certain types of messages (time hidden channels), and/or all of the information necessary for proper conveyance of the data from a transmitter to a receiver. The use of hidden channels requires the existence of a code defined between the transmitting part and the receiving part.

For example, a rule can limit the bandwidth, created by the messages in the TLV format with a "Value" information field, at 1 kb during the same fixed period of one hour (3600 seconds) and will for example be written:

```
FIELD id='Type' size='2'
    [ . . . ]
FIELD id='Size' size='2'
    [ . . . ]
FIELD id='Value' size='$Size' min='0' max='1024'
    BANDWIDTH max='1024o' period "3600s"'
    [ . . . ]
```

A state variable indicating the current value of the bandwidth of this type of message and a state variable defining the beginning of the fixed period are in particular associated with such a rule.

Other rules also make it possible to adapt the running of the filtering module based on the communication protocol implemented by a message received at the input of the filtering module.

In particular, by using a tactical radio set, a malicious user could use the switches between the listening mode and the transmitting mode to send sensitive information in Morse code, whereas his voice is systematically encrypted. The security policy may limit this hidden channel by limiting the number of transmission/reception mode switches per minute.

Let us now consider a rule monitoring the value of the "Type" information field of a message in TLV format, and the passage direction, allowed by the filtering module, of the message for each value of that field, said security policy further applying the time hidden channel limit indicated above. It will for example be written:

```
RULES
    FIELD id='Type' size='2'
        VALUE mask='FFFFh'
            FIXED value='0100h'
                RED-TO-BLACK
                [ . . . ]
            FIXED value='0101h'
                RED-TO-BLACK
                [ . . . ]
            INTERVAL min='0200h' max='0202h'
                BLACK-TO-RED
                [ . . . ]
            FIXED value='0300h'
                RED-TO-BLACK
                [ . . . ]
            INTERVAL min='0400h' max='0410h'
                BLACK-TO-RED
                [ . . . ]
            FIXED value='0500h'
                BLACK-TO-RED
                [ . . . ]
        [ . . . ]
    [ . . . ]
    FIELD id='SIZE' size='2'
        [ . . . ]
    FIELD id='Value' size='$Size' min='0' max='1020'
        BANDWIDTH max='1024o' period='3600s'
        [ . . . ]
```

In one embodiment, one or more filtering rules (FREQUENCY) monitor the frequency of certain types of messages sent between the red and black modules.

For example, a rule imposes a maximum passage frequency value through the filtering module of the messages from the red module toward the black module, whereof the first information field, with a size of two bits, assumes the value 100h (hexadecimal value).

The minimum period between two transmissions of two messages of this type is for example 10 s.

This rule may be written:

```
RULE
    FIELD size='2'
        VALUE mask='FFFFh'
            FIXED value ='100h'
                RED-TO-BLACK
                FREQUENCY period='10s'
```

This arrangement makes it possible to limit the existence of hidden channels.

The filtering module is defined such that any message not explicitly declared in the rules database as "TO BE SENT" is by default declared "DO NOT SEND".

In a step 102, the coherence and completeness of the set of filtering rules thus defined are verified.

In embodiments, this verification is done by a proofreading process by a person, or is automated, which is particularly suitable when one has decidable or semi-decidable coherence semantics.

The set of rules is considered to verify the coherence criterion if no rule from the set of rules defined in step 101 creates anomalies with another rule. In particular, if a deontic logic is followed, none of anomalies A1 to A4 described below may be allowed.

Generalization anomaly A1: one rule is a generalization of another if they have different actions and the first rule is also applied to all of the objects of the second (if two rules R1, R2, respectively, are candidates for application to a set of messages E1, E2, respectively), the associated actions are different, and E1 is included in E2, there is an anomaly because it has been impossible to decide which rule must be applied).

Overlap anomaly A2: a rule is overlapped when the preceding rule is applied to all of its objects, knowing that the two rules have different actions.

Correlation anomaly A3: two rules, with different actions, are correlated if each of them is also applied to a subset of the objects to which the other is applied.

Redundancy anomaly A4: the rule is redundant if it executes the same action on the same objects as another rule.

The set of rules is considered to verify the completeness criterion if it is demonstrated that the rules of the set of rules defined in step 101 are able to filter all of the messages that may be provided at the input of the filtering module. In one embodiment, the set of rules is considered to verify the completeness criterion if furthermore, conversely, all of the rules are used.

If the set of rules does not verify the completeness or coherence criterion, its definition is revised such those criteria are verified.

In embodiments, only some of the criteria or certain aspects of those criteria are verified.

In a step 103, the set of filtering rules thus defined, comprising the protocol automatons and representing the selected security policy, and the completeness and coherence of which have been validated, is compiled, so as to make it readable and directly exploitable by the processing block 14.

The set of rules thus compiled is saved in a rules database 15, which is an element of the filtering module 5. The state variables associated with the security policy are also stored in a block 16 of state variables of the filtering module.

The rules database 15 and the state variables block 16 are suitable for operating in collaboration with a processing block 14.

According to the embodiments of the invention, all or some of the steps of the method 100 are carried out following the execution, on computation means, of software instructions from a computer program for defining a filtering module in one embodiment of the invention.

In a step 104 (not shown), the security policy is applied, by the operational implementation of the filtering module 5, on messages that are provided to it.

Filtering Module

According to a second aspect, the invention proposes a filtering module, for example similar to the filtering module 5 of the cryptographic equipment 1.

In this filtering module 5, the rules database 15, obtained at the end of the method 100 by the compilation of the security policy, is stored.

In the state variables block 16, the values of the state variables defined in association with the rules during implementation of the method 100 are initialized.

The processing block 14 is suitable, following receipt of a message coming from the red module 2, for proceeding with the evaluation of the filtering rules defined in the database 15, to allow its transfer to the black module 3.

The processing block 14 is suitable, following receipt of a message from the black module 3, for proceeding with the evaluation of the filtering rules defined in the rules database 15; to allow its transfer to the red module 2.

The processing block 14 more specifically evaluates the root filtering rule defined in the rules database 15, following receipt of a message.

The evaluation of the root filtering rule causes the evaluation of its daughter rules.

Recursively, the evaluation of the daughter rules causes the evaluation of all or part of the filtering rules tree making up the rules database 15.

The values of the state variables in the state variables block 16 are updated during the application of the rules of the security policy, on the messages monitored by the filter module during its operational running.

In particular, the evaluation of a filtering rule may cause the modification of the current value of one or more state variables. The state variables are not modified immediately so as to preserve the coherence of the state variables during the application of the security policy to the message. When the evaluation of the filtering rules is complete and if all of the evaluated filtering rules have returned TRUE or TO BE SENT, then the processing block 14 updates the state variables modified by the evaluated filtering rules.

It will be noted that during operational running of the filtering module 5, the rules database 15 is invariant, whereas the values of the state variables of the state variables block 16 are updated during the application of the rules to the messages.

The proposed solution consists of basing the architecture of the filtering module on three primary parts, which are the processing block, the rules database, and the state variables block 16. The security policy is completely defined and parameterized in the rules database by the filtering rules associated with automatons. The application of these rules is determined by the processing block 14, the behavior of which may be frozen. The separation of the application of the security policy and its definition facilitates the implementation of modifications of the security policy.

The invention is characterized by:
this implantation of the security policy of the filtering in the form of rules, these rules making it possible to monitor the static, time and dynamic properties of the messages allowed to pass through the filter module;
separation of the design, development and securing of the security policy from its application;
the delayed integration of the rules into the filtering module.

The invention makes it possible to configure the security policies within the filtering module, instead of hard coding them.

The invention thus makes it possible to respond to the limitations of the filtering modules of the prior art regarding their lack of upgrade capacities: in fact, according to the invention, to modify the behavior of the filtering module, it suffices to modify the security policy, then to compile it and load it into the filtering module in the form of a rules database, without modifying the treatment block. Furthermore, the invention further makes it possible to have a filtering module with an adaptive behavior. Likewise, the processing block may be identical in filtering modules with different confidentiality levels and/or applying different security policies; only the rules databases will differ.

The advantages of the proposed solution are present throughout the entire lifetime of the filtering module.

During development, it makes it possible to meet the need for changing configurations during development and allows quasi-continuous integration of the filtering module.

During the certification/qualification of the equipment, it provides a high guarantee and proof of the coherence and completeness of the rules. It performs a rigorous implantation of a suitable language, and makes it possible to decorrelate the design process of the filtering module from the design process of the security policies (100). It makes it possible to manage the efficacy/security compromise flexibly by adapting the definition of the security policy to the security needs (approval level of the cryptographic equipment).

The invention has been described above in reference to an encryptor. Nevertheless, it may be implanted for any filtering module in a system with domains D1 and D2, with distinct confidentiality levels N1 and N2, respectively, in particular when it is required to communicate level N2 information between D1 and D2.

Such a filtering module according to the invention may thus be implemented in firewall systems, security gateway systems, equipment with multiple security levels such as terminals, servers, diodes, encryptors, routers, etc.

In the case of the cryptographic equipment 1, the considered information as described is messages in the monitoring and management plans (example: routing and service quality information). Nevertheless, in other embodiments, the information is data other than messages in the monitoring and management plans, to be sent between the black and red modules.

In the considered embodiment, the set of rules is organized in a tree structure. In other embodiments, the set of rules is structured differently, for example in the form of a list of rules to be linked. What matters is that the order in which the processing module must take all of the rules into account relative to one another is provided to it by the database.

The invention claimed is:

1. A processor-implemented method for manufacturing a filtering module, according to a predetermined security policy, between a first hardware processing module, and a second hardware processing module, the first hardware processing module processing information with a first sensitivity level, the second hardware processing module processing information with a second sensitivity level distinct from the first sensitivity level, the first and second hardware processing modules being connected, in parallel with the filtering module, by a hardware cryptographic module for applying cryptographic functions, the modules being contained on a non-transitory computer-readable medium, the method comprising:
   manufacturing a set of filtering rules translating the predetermined security policy in a compilable language, the filtering rules manufacturing the properties of the information whereof transmission is allowed by the filtering module between the first and second hardware processing modules;
   validation processing for the predefined set of rules, validating that a transmission authorization or refusal has in fact been provided by applying the set of rules to any information that is provided at the input of the filtering module;
   compiling the predefined set of rules; and
   integrating the compiled set of rules into a rules database of the filtering module,
   wherein the set of filtering rules includes at least one protocol automaton, defined by a set of states corresponding to successive steps of the implementation of a communication protocol, and events causing transitions between the states,
   wherein the step for validating the coherence of the rules comprises detecting at least one anomaly from among:
   the existence in the set of rules of first and second rules associated with different actions, the first rule being applied on all of the objects of the second;
   the existence in the set of rules of two rules associated with different actions, and each of them is applied on a subset of the objects to which the other is applied; and
   the existence of two rules executing the same action on the same objects,
   wherein the set of filtering rules defines static, time and dynamic properties of the information authorized to be transmitted,
   wherein the hardware filtering module includes a hardware processing module adapted for executing all of the rules integrated into the rules database upon receipt of information to be filtered.

2. The method for manufacturing a filtering module as recited in claim 1 wherein state variables associated with the filtering rules are defined, and a refusal or authorization is provided following the execution of the set of rules as a function of current values calculated for the state variable values.

3. The method for manufacturing a filtering module as recited in claim 1 wherein the validation processing for the predefined set of rules further comprises a step for validating the coherence of the rules of the set of rules.

4. The method for manufacturing a filtering module as recited in claim 1 wherein the set of rules is defined according to a rules tree structure.

5. The method for manufacturing a filtering module as recited in claim 1 wherein the filtering module is defined such that the information from the first hardware processing module whereof transmission is authorized by the filtering module is transmitted to the second hardware processing module in clear.

6. The method for manufacturing a filtering module as recited in claim 1 wherein the application order and logic composition of the results of the rules is defined by the set of filtering rules.

7. A hardware filtering module suitable for filtering information according to a security policy between a first hardware processing module, and a second hardware processing module, the first hardware processing module processing sensitive information, the second hardware processing module processing non-sensitive information, the first and second hardware processing module being connected, in parallel with the hardware filtering module, by a hardware cryptographic module for applying cryptographic functions, the hardware filtering module comprising:
   a hardware processing module and a rules database including a set of rules manufacturing the predetermined security policy, in a compiled language, the filtering rules manufacturing the properties of the information whereof transmission is authorized by the hardware filtering module between the first and second hardware processing modules,
   wherein the set of rules integrated into the rules database results from:
   manufacturing a set of filtering rules translating the predetermined security policy in a compilable language, the filtering rules manufacturing the properties of the information whereof transmission is allowed by the hardware filtering module between the first and second hardware processing module;
   validation processing for the predefined set of rules, validating that a transmission authorization or refusal has in fact been provided by applying the set of rules to any information that is provided at the input of the hardware filtering module;
   compiling the predefined set of rules; and
   integrating the compiled set of rules into a rules database of the hardware filtering module,
   wherein the set of filtering rules includes at least one protocol automaton, defined by a set of states corresponding to successive steps of the implementation of a communication protocol, and events causing transitions between the states, wherein the step for validating the coherence of the rules comprises detecting at least one anomaly from among:

the existence in the set of rules of first and second rules associated with different actions, the first rule being applied on all of the objects of the second;

the existence in the set of rules of two rules associated with different actions, and each of them is applied on a subset of the objects to which the other is applied; and the existence of two rules executing the same action on the same objects, wherein the set of filtering rules defines static, time and dynamic properties of the information authorized to be transmitted, wherein the hardware filtering module includes a hardware processing module adapted for executing all of the rules integrated into the rules database upon receipt of information to be filtered.

8. Cryptographic equipment comprising:

a first hardware processing module information with a first sensitivity level;

a second hardware processing module information with a second sensitivity level different from the first sensitivity level;

a hardware cryptographic module for applying cryptographic functions, connecting the first and second hardware processing modules; and a hardware filtering module suitable for filtering information according to a security policy between a first hardware processing module, and a second hardware processing module, the first hardware processing module processing sensitive information, the second hardware processing module processing non-sensitive information, the first and second hardware processing module being connected, in parallel with the hardware filtering module, by a hardware cryptographic module for applying cryptographic functions, the hardware filtering module includes:

a hardware processing module and a rules database including a set of rules manufacturing the predetermined security policy, in a compiled language, the filtering rules manufacturing the properties of the information whereof transmission is authorized by the hardware filtering module between the first and second hardware processing modules, wherein the set of rules integrated into the rules database results from:

manufacturing a set of filtering rules translating the predetermined security policy in a compilable language, the filtering rules manufacturing the properties of the information whereof transmission is allowed by the hardware filtering module between the first and second hardware processing module;

validation processing for the predefined set of rules, validating that a transmission authorization or refusal has in fact been provided by applying the set of rules to any information that is provided at the input of the hardware filtering module;

compiling the predefined set of rules; and integrating the compiled set of rules into a rules database of the hardware filtering module, wherein the set of filtering rules includes at least one protocol automaton, defined by a set of states corresponding to successive steps of the implementation of a communication protocol, and events causing transitions between the states, wherein the step for validating the coherence of the rules comprises detecting at least one anomaly from among:

the existence in the set of rules of first and second rules associated with different actions, the first rule being applied on all of the objects of the second;

the existence in the set of rules of two rules associated with different actions, and each of them is applied on a subset of the objects to which the other is applied; and the existence of two rules executing the same action on the same objects, wherein the set of filtering rules defines static, time and dynamic properties of the information authorized to be transmitted, wherein the hardware filtering module includes a hardware processing module adapted for executing all of the rules integrated into the rules database upon receipt of information to be filtered.

* * * * *